(12) United States Patent
Sekine et al.

(10) Patent No.: US 11,820,328 B2
(45) Date of Patent: Nov. 21, 2023

(54) VEHICLE ANTI-THEFT DEVICE, VEHICLE ANTI-THEFT METHOD, AND COMPUTER PROGRAM

(71) Applicant: JVCKENWOOD Corporation, Yokohama (JP)

(72) Inventors: Takafumi Sekine, Yokohama (JP); Hiroaki Yokoyama, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 750 days.

(21) Appl. No.: 16/968,660

(22) PCT Filed: Feb. 4, 2019

(86) PCT No.: PCT/JP2019/003811
§ 371 (c)(1),
(2) Date: Aug. 10, 2020

(87) PCT Pub. No.: WO2019/156015
PCT Pub. Date: Aug. 15, 2019

(65) Prior Publication Data
US 2021/0001809 A1  Jan. 7, 2021

(30) Foreign Application Priority Data
Feb. 9, 2018 (JP) .................... 2018-022159

(51) Int. Cl.
*B60R 25/24* (2013.01)
*B60R 25/22* (2013.01)

(52) U.S. Cl.
CPC ............ *B60R 25/24* (2013.01); *B60R 25/225* (2013.01)

(58) Field of Classification Search
CPC ........ B60R 25/24; B60R 25/225; B60R 25/22
See application file for complete search history.

(56) References Cited

FOREIGN PATENT DOCUMENTS

| JP | 2005299261 A | 10/2005 |
|----|--------------|---------|
| JP | 2009054012 A | 3/2009 |
| JP | 2011255731 A | 12/2011 |

(Continued)

OTHER PUBLICATIONS

JPO Decision to Grant a Patent corresponding to JP Application No. 2019-570729; dated Sep. 6, 2022.

(Continued)

*Primary Examiner* — Robert L Deberadinis
(74) *Attorney, Agent, or Firm* — CANTOR COLBURN LLP (57) ABSTRACT

This vehicle anti-theft device comprises: a wireless receiver that is installed in a vehicle and receives information including the ID of a portable device transmitted wirelessly from the portable device; a first registration processing unit that registers a first ID received by the wireless receiver, using a predefined procedure, as the ID of the portable device belonging to an owner group; a second registration processing unit that, when a second ID is received by the wireless receiver together with the ID registered by the first registration processing unit, registers the second ID as the ID of the portable device belonging to an affiliate group; and a theft determination processing unit that, on detecting movement of the vehicle without having received the ID registered by the first registration processing unit or the ID registered by the second registration processing unit at that time, determines that the vehicle is in a stolen state.

5 Claims, 5 Drawing Sheets

(56) References Cited

FOREIGN PATENT DOCUMENTS

| | | |
|---|---|---|
| JP | 2013166447 A | 8/2013 |
| JP | 2016076899 A | 5/2016 |
| JP | 2017222299 A | 12/2017 |

OTHER PUBLICATIONS

International Search Report for International Application No. PCT/JP2019/003811; dated Mar. 26, 2019.

FIG. 1

| DEVICE-SPECIFIC ID | GROUP | NUMBER OF TIMES ID EXTRACTED |
|---|---|---|
| AAAAA | OWNER | — |
| BBBBB | CONCERNED PERSON | 52 |
| CCCCC | CONCERNED PERSON | 38 |
| DDDDD | CONCERNED PERSON | 18 |
| FFFFF | — | 9 |
| GGGGG | — | 2 |
| HHHHH | — | 1 |
| . . . | | |

VEHICLE ANTI-THEFT DEVICE, VEHICLE ANTI-THEFT METHOD, AND COMPUTER PROGRAM

CROSS REFERENCE TO RELATED APPLICATIONS

This is the U.S. national stage of application No. PCT/JP2019/003811, filed on Feb. 4, 2019. Priority under 35 U.S.C. § 119(a) and 35 U.S.C. § 365(b) is claimed from Japanese Application No. 2018-022159, filed Feb. 9, 2019, the disclosure of which is also incorporated herein by reference

TECHNICAL FIELD

The present invention relates to a vehicle anti-theft device, a vehicle anti-theft method, and a computer program.

BACKGROUND ART

Conventionally, an immobilizer has been widely used for vehicle anti-theft measures. Usually, when starting the engine of a vehicle, the engine can be started if the inside of the key cylinder and the key crest of the key are mechanically aligned. On the other hand, the immobilizer can start the engine only when the unique ID code of the electronic chip embedded in the dedicated key is electronically verified with the ID code on the vehicle side.

It is also known for vehicle anti-theft measures that an in-vehicle device outputs a response signal in response to an activation signal transmitted from a monitoring device so that, based on whether the response signal is received or not, the monitoring device determines whether a vehicle parked in a parking area defined in advance as a space for parking the vehicle has been stolen or not, and if the result of the determination is that the vehicle has been stolen, the monitoring device notifies it (see, for example, PLT 1).

CITATION LIST

Patent Literature

[PTL 1] JP 2009-54012 A

SUMMARY OF INVENTION

Technical Problem

Since an immobilizer for vehicle anti-theft measures is to prevent staring the engine other than those having a dedicated key, it cannot prevent the vehicle from being stolen using, for example, a tow truck. Further, when there are a plurality of users who use the vehicle, it is necessary to prepare as many dedicated keys as the number of users in order to use the immobilizer for vehicle anti-theft measures.

The art described in PTL 1 can prevent a vehicle from being stolen by means of such as a tow truck. However, in the art described in PTL 1, it is only possible to prevent moving the vehicle from the parking position where the monitoring device is provided.

The present invention aims to solve the above-mentioned problems, that is, to provide a vehicle anti-theft device, a vehicle anti-theft method, and a computer program that can prevent the vehicle from being stolen.

Solution to Problem

In order to solve the above-mentioned problems, according to one aspect of the present invention, it is provided a vehicle anti-theft device provided in a vehicle comprising: a radio receiver for receiving information including an ID of a mobile device wirelessly transmitted from the mobile device; a first registration processing unit for registering a first ID received by the radio receiver in a predetermined procedure as an ID of a mobile device belonging to an owner group; a second registration processing unit for registering a second ID received by the radio receiver together with the ID registered in the first registration processing unit as an ID of a mobile device belonging to a concerned person group; and a theft determination processing unit for determining the vehicle being in a stolen state when the movement of the vehicle is detected while it is received no ID registered in the first registration processing unit or in the second registration processing unit at that time.

According to another aspect of the present invention, it is provided a vehicle anti-theft method including steps of: registering IDs each included in information transmitted from a predetermined mobile device having an ID and received by a radio receiver; and determining a vehicle being in a stolen state when a movement of the vehicle is detected while no information including a registered ID is received at that time; wherein: the step of registering includes: a first registration step for registering a first ID received by the radio receiver in a predetermined procedure as an ID of a mobile device belonging to an owner group; and a second registration step for registering a second ID received by the radio receiver together with the ID registered in the first registration step as an ID of a mobile device belonging to a concerned person group; and the step of determining is executed in a state where it is received no ID registered in the first registration step or in the second registration step at that time.

According to yet another aspect of the present invention, it is provided a computer program executed by a processor of a vehicle anti-theft device provided in a vehicle when installed in the processor to perform steps of: registering IDs each included in information transmitted from a predetermined mobile device having an ID and received by a radio receiver; and determining a vehicle being in a stolen state when a movement of the vehicle is detected while no information including a registered ID is received at that time; wherein: the step of registering includes: a first registration step for registering a first ID received by the radio receiver in a predetermined procedure as an ID of a mobile device belonging to an owner group; and a second registration step for registering a second ID received by the radio receiver together with the ID registered in the first registration step as an ID of a mobile device belonging to a concerned person group; and the step of determining is executed in a state where it is received no ID registered in the first registration step or in the second registration step at that time.

Advantageous Effects of Invention

According to the present invention, it is possible to prevent the vehicle from being stolen by detecting and notifying the movement of the vehicle when the vehicle owner or a person concerned is not near the vehicle.

DESCRIPTION OF EMBODIMENTS

A vehicle anti-theft device according to an embodiment of the present invention will be described hereinafter with reference to FIGS. 1 to 5.

Figure 1:
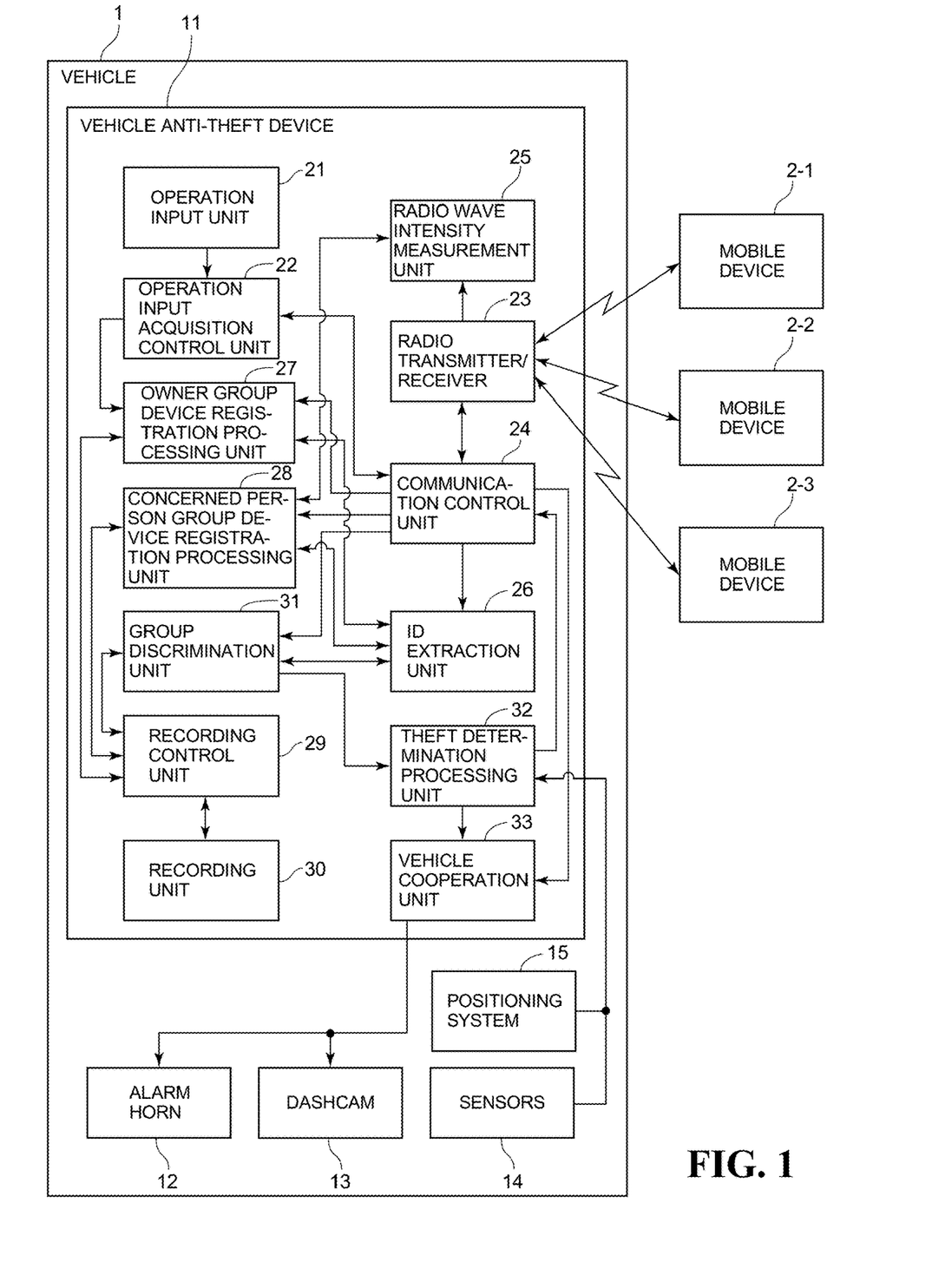
FIG. 1 is a functional block diagram of a vehicle anti-theft device provided in a vehicle.

With reference to FIG. 1, a vehicle anti-theft device 11 according to an embodiment of the present invention will be described. The vehicle anti-theft device 11 is provided in a vehicle 1. FIG. 1 is a functional block diagram for explaining a function of the vehicle anti-theft device 11 together with a configuration of the vehicle 1 related to the function.

In FIG. 1, a mobile devices 2-1 to 2-3 near the vehicle 1, the vehicle anti-theft device 11 provided in the vehicle 1, an alarm horn 12 provided in the vehicle 1, a dashcam 13, various sensors 14 and positioning system 15 are shown. Although three mobile devices 2-1 to 2-3 are shown here, this number changes depending on the situation at that time, and there may be a case where a larger number of mobile devices exist or a case where none of them exists. Each of the mobile devices 2-1 to 2-3 may be a device having a device-specific ID and having a wireless communication function, such as a smartphone, a mobile phone, or a mobile device. If the mobile devices 2-1 to 2-3 will not be needed to be distinguished, these will be hereinafter collectively referred to as the mobile devices 2. The device-specific ID may be an address in a communication system for communicating with the vehicle anti-theft device 11, for example, a BD address (Bluetooth Device Address) in Bluetooth (registered trademark), or an ID that can be notified to the vehicle anti-theft device 11 in that communication system, such as a telephone number or a MAC (Media Access Control) address. The various sensors 14 include sensors having a function of detecting that the vehicle 1 has moved, such as an acceleration sensor and an axle sensor. The positioning system 15 has a function of measuring the current position of the vehicle 1, such as a GPS device. If it is possible to detect that the vehicle 1 has moved, the vehicle 1 may be provided with at least one of the various sensors 14 or the positioning system 15. When the movement is detected, information thereof is notified to the vehicle anti-theft device 11. Further, it is also possible to notify the vehicle anti-theft device 11 of information such as the vehicle speed via a CAN (Controller Area Network) in the vehicle 1 so that the vehicle anti-theft device 11 can detect the movement of the vehicle.

In the vehicle anti-theft device 11, it is registered one or more of mobile devices 2 held by the owner of the vehicle 1 (a person who mainly uses the vehicle 1). In the vehicle anti-theft device 11, it can be also automatically registered mobile devices 2 held by persons concerned with the owner of the vehicle 1 when each of the persons is estimated by the vehicle anti-theft device 11 as a concerned person of the owner. Then, when the movement of the vehicle 1 is detected by the various sensors 14 and the positioning system 15, the vehicle anti-theft device 11 determines whether the registered mobile device 2 exists inside or near the vehicle 1 or not. If it is determined that the vehicle 1 does not exist, the vehicle anti-theft device 11 determines that the vehicle 1 has been stolen, and then instructs the alarm horn 12 to generate warning sound and the dashcam 1 to start recording through the CAN in the vehicle 1 or a direct instruction if direct control is possible. If a message can be sent to the mobile device 2 by a communication system other than Bluetooth, a warning message can be sent to the registered mobile device 2 by using the function thereof.

The mobile device 2 is capable of wirelessly communicating with the vehicle anti-theft device 11. As the mobile device 2, it may be used, for example, a device having a device-specific ID and a wireless communication function, such as a smartphone, a mobile phone, or a mobile device. Any wireless communication system may be used as long as it performs authentication by ID, and for example, Bluetooth or the like may be used. Hereinafter, it will be described a case where a smartphone is used as the mobile device 2 and communication is performed with the vehicle anti-theft device 11 and Bluetooth. A BD address, which is a unique 48-bit address used to identify a Bluetooth-compatible device, is associated with a smartphone that can communicate using Bluetooth. In Bluetooth communication, Bluetooth-compatible devices execute an authentication procedure to authenticate each other for maintaining security so as not to communicate with unrelated devices. In this case, the mobile device 2 transmits own BD address for communication with another Bluetooth-compatible device. The vehicle anti-theft device 11 authenticates the transmitted BD address and connects to the mobile device 2.

In this system, when the mobile device 2 of the owner of the vehicle 1 and the vehicle anti-theft device 11 are authenticated and connected by communication, the vehicle anti-theft device 11 decides that the mobile device 2 is held by the vehicle owner and then the BD address of the mobile device 2 is registered in the vehicle anti-theft device 11 by the process described below. One or more mobile devices 2 held by the owner of the vehicle 1 can be registered as an owner group in a registration table described later.

When the mobile device 2-1 registered as the mobile device 2 held by the owner of the vehicle 1 is connected to and DB addresses transmitted from the other mobile devices 2-2 and 2-3 simultaneously are detected, the vehicle anti-theft device 11 execute the process described below to register the DB addresses of the mobile devices 2-2 and 2-3 in itself as DB addresses of mobile devices 2 held by the persons concerned with the owner of the vehicle 1. It can be registered one or more mobile devices 2 held by the persons concerned with the owner of the vehicle 1 in a registration table described later as a concerned person group in a registration table described later.

The vehicle anti-theft device 11 is configured by functional units including an operation input unit 21, an operation input acquisition control unit 22, a radio transmitter/receiver 23, a communication control unit 24, a radio wave intensity measurement unit 25, an ID extraction unit 26, an owner group device registration processing unit 27, a concerned persons group device registration processing unit 28, a recording control unit 29, a recording unit 30, a group discrimination unit 31, a theft determination processing unit 32, and a vehicle cooperation unit 33. Each function of the owner group device registration processing unit 27, the concerned person group device registration processing unit 28, the recording control unit 29, the group discrimination unit 31, the theft determination processing unit 32, and the vehicle cooperation unit 33 is realized by one or more processors. Each processor may be a general-purpose microprocessor that realizes each function by software, or may be an ASIC (Application Specific Integrated Circuit), PLD (Programmable Logic Device), or the like. At least a part of the function of the operation input acquisition control unit 22 may also be realized by at least one of the above-mentioned processors. The functions of the communication control unit 24, the radio wave intensity measuring unit 25, and the ID extracting unit 26 are realized by at least one of the above-mentioned processors or a separate digital signal processor.

The operation input unit 21 includes, for example, input devices such as buttons, keys, and a touch panel, receives an input operated by a user according to a screen display prompting an operation input by the operation input acquisition control unit 22, and supplies the input information to the acquisition control unit 22.

The radio transmitter/receiver 23 transmits and receives radio signals to and from the mobile device 2 under the control of the communication control unit 24. The radio transmitter/receiver 23 supplies the signal received from the mobile device 2 to the communication control unit 24.

The communication control unit 24 controls wireless communication with the mobile device 2 by the radio transmitter/receiver 23. When the information supplied from the radio transmitter/receiver 23 is an operation input to the vehicle anti-theft device 11 by the user, the communication control unit 24 supplies the supplied information to the operation input acquisition control unit 22. The communication control unit 24 also supplies the BD address of the mobile device 2 supplied from the radio transmitter/receiver 23 to the group discrimination unit 31, as well as the owner group device registration processing unit 27 and the concerned person group device registration processing unit 28.

The operation input acquisition control unit 22 receives a user operation input from the operation input unit 21 or the communication control unit 24. When a command for starting the registration process for the mobile device 2 to be registered into the owner group is received as the user's operation input, the operation input acquisition control unit 22 notifies the communication control unit 24 and the owner group device registration processing unit 27 of starting the registration process for the mobile device 2 to be registered into the owner group.

The radio field intensity measuring unit 25 measures the radio field intensity of the mobile device 2 in the wireless communication executed by the radio transmitter/receiver 23 with the mobile device 2, and supplies it to the concerned person group device registration processing unit 28.

The ID extraction unit 26 extracts the ID of the mobile device 2 included in the signal received by the radio transmitter/receiver 23 from the mobile device 2. Here, the ID extraction unit 26 extracts the BD address of the mobile device 2. The mobile device 2 does not need to be communicatively connected to the vehicle anti-theft device 11, and the ID extraction unit 26 may extract all BD addresses transmitted from the mobile devices 2 existing in vicinity of the vehicle anti-theft device 11. The ID extraction unit 26 supplies the extracted BD addresses to the owner group device registration processing unit 27, the concerned person group device registration processing unit 28 and the group discrimination unit 31.

The owner group device registration processing unit 27 executes a process related to registration of the mobile device 2 of the owner group. When it is received a notification of the registration process of the mobile device 2 started, the owner group device registration processing unit 27 acquires the BD address of the mobile device 2, that is authenticated and is connected, from the ID extraction unit 26 and supplies it to the recording control unit 29 so that the BD address is registered in the registration table recorded in the recording unit 30. The registration table will be described later with reference to FIG. 2.

The concerned person group device registration processing unit 28 executes a process related to registration of the mobile device 2 into the concerned person group. The concerned person group device registration processing unit 28 acquires the BD address of the mobile device 2 from the ID extraction unit 26 and receives the measured result of the radio field intensity of the mobile device 2 in the radio transmission and reception executed by the radio transmitter/receiver 23 with the mobile device 2, supplied from the radio field intensity measurement unit 25. Consider a case where a plurality of BD addresses are supplied from the ID extraction unit 26, one of the BD addresses being of the mobile device 2-1 which is registered in the owner group and is in connection and another being of the mobile device 2-2 which is not registered in the owner group, that is, where the BD address of the mobile device 2-2 is received during the BD address of the mobile device 2-1 which is registered in the owner group is receive. In such a case, the concerned person group device registration processing unit 28 monitors the radio field intensities of the mobile devices 2-1 and 2-2 in the radio reception, supplied from the radio field intensity measuring unit 25 and determines whether the mobile device 2-2 not registered in the owner group is the mobile device 2 held by the person concerned with the owner. Specifically, when the degree of change in the radio field intensity of the radio wave received from the unregistered mobile device 2-2 is similar with that from the mobile device 2-1 registered in the owner group, the concerned person group device registration processing unit 28 may presume that the owner of the mobile device 2-2 has approached to the vehicle 1 on foot and boarded the vehicle 1 together with the owner of the mobile device 2-1 registered in the owner group. Therefore, in this case, the owner of the mobile device 2-2 not registered in the owner group can be estimated to be a person concerned with the owner.

Regarding the similarity of the radio field intensity, a large allowance may be taken with respect to time in consideration of a case where the owner of the mobile device 2-1 and the owner of the mobile device 2-2 board the vehicle 1 with a time lag. The same applies when getting off from the vehicle 1. Further, when the degrees of changes in the radio field intensities of the mobile device 2-1 registered in the owner group and the mobile device 2-2 not registered in the owner group are both less than the predetermined values at the movement of the vehicle being detected by the positioning system 15 or the like, the owner of the mobile device 2-2 may be determined as in the vehicle with the owner of the vehicle so that the owner of the mobile device 2-2 not registered in the owner group may be presumed as a person concerned with the owner.

When the mobile device 2-2 is discriminated as held by the concerned person of the owner, the concerned person group device registration processing unit 28 registers the BD address of the mobile device 2-2 in the in the registration table recorded in the recording unit 30 as of a mobile device of the concerned person group. The registration table will be described later with reference to FIG. 2.

In the registration process of the concerned person group, the more stringent the conditions for the judgment based on the radio field strength and the more the number of times set for discriminating the concerned person, the higher the security becomes but the mobile device 2-2 held by the concerned person is less likely to be registered as the mobile device 2 of the concerned person group, which is inferior in practicality. On the other hand, the milder the condition of the judgment by the radio field intensity and the smaller the number of times set for discriminating the concerned person, the faster the automatic registration is performed and the higher the practicality, but the lower the security becomes. That is, with respect to the determination condition based on the radio field intensity and the estimated number of times required to be registered as a concerned person, the most suitable value may be set from the viewpoint of practicality and security. Instead of making a determination based on the radio field intensity, when the BD address of the mobile device 2-2 is received during the BD address of the mobile device 2-1 which is registered in the owner group is receive, it may be determined the mobile device 2-2 as a mobile device of the concerned person group based on the number of times the BD address detected. In this case, it is preferable to increase the number of times of determination as a person concerned, for example, 10 times or more.

The recording control unit 29 registers the information in the registration table recorded in the recording unit 30 based on the information supplied from the owner group device registration processing unit 27 and the concerned person group device registration processing unit 28, or controls information update.

Figure 2:
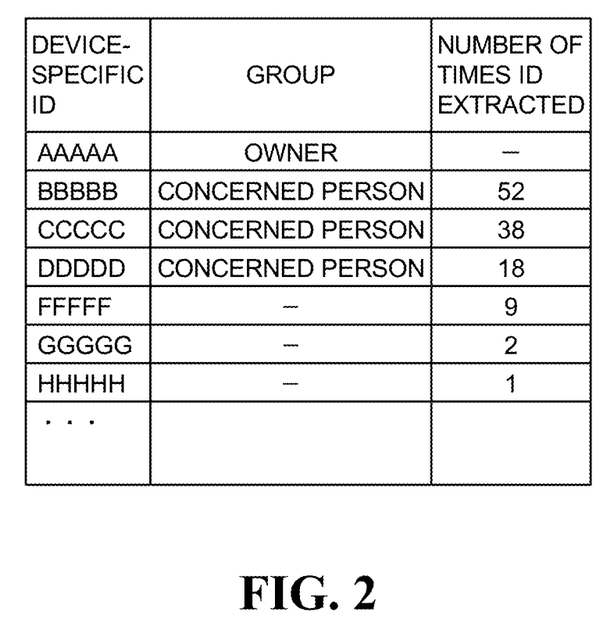
FIG. 2 is a diagram for explaining a registration table.

The recording unit 30 records the registration table under the control of the recording control unit 29. In the registration table recorded in the recording unit 30, for example, as shown in FIG. 2, here are registered the BD address of the mobile device 2 registered as the owner group and the BD addresses of the mobile device 2 held by users determined as persons concerned with the owner with the estimated number of times. The recording unit 30 may be a writable nonvolatile memory such as an HDD (Hard Disk Drive) or an SSD (Solid State Drive).

The group discrimination unit 31 refers to the registration table recorded in the recording unit 30 to discriminate whether the mobile device 2 having the BD address extracted by the ID extraction unit 26 is registered as the owner group, in the concerned person group or not registered as any group, and supplies the discrimination result to the theft determination processing unit 32.

The theft determination processing unit 32 detects the movement of the vehicle 1 based on the information supplied from the various sensors 14 and the positioning system 15. Then, when the movement of the vehicle 1 is detected and it is not receive any discrimination result that the BD address of the mobile device 2 registered as the owner group or the concerned person group is received from the group discrimination unit 31, the theft determination processing unit 32 determines that the vehicle 1 is in the theft state. When it is determined that the vehicle 1 is in the theft state, the theft determination processing unit 32 notifies the vehicle cooperation unit 33 that the vehicle 1 is in the theft state.

When it is received a notification that the vehicle is in a stolen state from the theft determination processing unit 32, the vehicle cooperation unit 33 controls the alarm horn 12 and the dashcam, via a CAN in the vehicle 1 or by a direct instruction when direct control is possible, to execute a predetermined operation in the stolen state. That is, the alarm horn 12 is controlled to generate a warning sound alarm, and/or the dashcam 13 is controlled to start video recording. Further, an ECU (Electronic Control Unit) in the vehicle 1, which has been notified that the vehicle is in a stolen state, may control blinkers or hazard lamps to notify the outside of the vehicle of the abnormal state. Further, the vehicle cooperation unit 33 may control the radio transmitter/receiver 23 to notify the owner of the mobile device 2 or a predetermined notification target such as the police by such as mail transmission or telephone call. In this case, the notification target may be set in advance, or the notification target may be changed depending on the passage time after it is determined to be stolen.

As described above, the vehicle anti-theft device 11 provided in the vehicle comprises the radio transmitter/receiver 23 as a radio receiver for receiving information including the ID of the mobile device 2 wirelessly transmitted from the mobile device 2, the owner group device registration processing unit 27 as a first registration processing unit for registering a first ID received in a predetermined procedure by the radio transmitter/receiver 23, into the recording unit 30 via the recording control unit 29, as an ID of the mobile device 2 belonging to the owner group, the concerned person group device registration processing unit 28 as a second registration processing unit for registering a second ID, into the recording unit 30 via the recording control unit 29, as an ID of the mobile device belonging to the concerned person group, when the second ID is received by the radio transmitter/receiver 23 together with the ID registered in the owner group device registration processing unit 27 by the radio transmitter/receiver 23, and the theft determination processing unit 32 for determining the vehicle 1 being in a theft state when a movement of the vehicle 1 is detected on a state where it is received neither the ID registered in the owner group device registration processing unit 27 nor the ID registered in the concerned person group device registration processing unit 28 at that time, the state being discriminated by the group discrimination unit 31.

Thus, the vehicle anti-theft device 11 can automatically detect a mobile device 2 held by a person concerned with the owner of the vehicle 1 by registering the mobile device 2 held by the owner of the vehicle 1 and prevent the vehicle from being stolen without using a dedicated device even if the vehicle is to be used by a plurality of persons.

Figure 3:
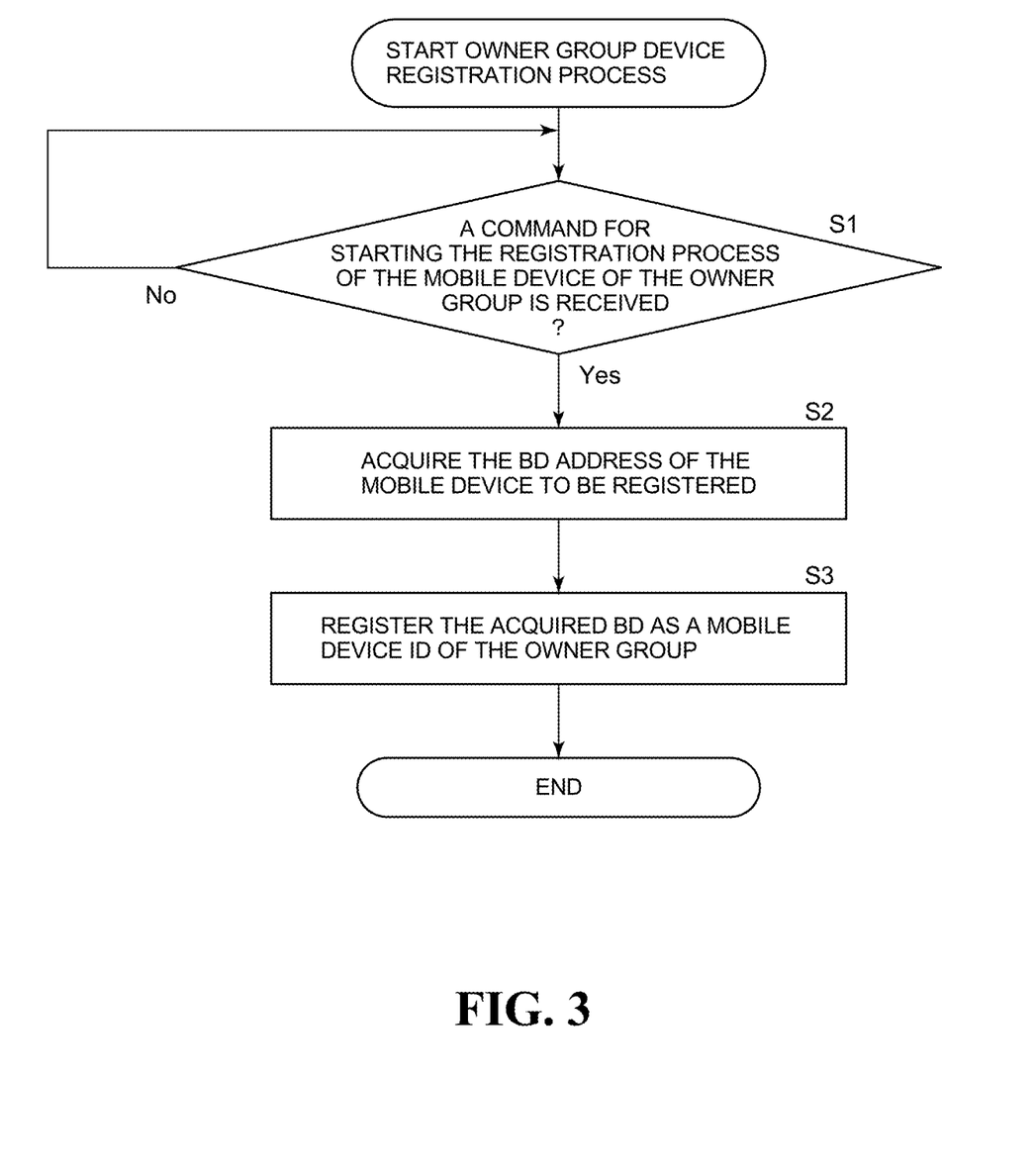
FIG. 3 is a flowchart for explaining an owner group device registration process.

The owner group device registration process executed by the vehicle anti-theft device 11 will be described with reference to the flowchart in FIG. 3.

In step S1, the operation input acquisition control unit 22 determines whether or not a command is received from the operation input unit 21 or the communication control unit 24 for starting registration processing of a mobile device 2 of the owner group. When it is determined in step S1 that the command for starting the registration process of the mobile device 2 of the owner group has not been received, the process of step S1 is repeated until it is determined that the command for starting the registration process is received.

When it is determined in step S1 that the command for starting the registration process of the mobile device 2 of the owner group is received, the operation input acquisition control unit 22 notifies the communication control unit 24 and the owner group device registration processing unit 27 of starting the registration process of the mobile device 2 of the owner group in step S2. The communication control unit 24 controls the radio transmitter/receiver 23 to acquire the BD address of the mobile device 2 to be registered, and supplies it to the owner group device registration processing unit 27.

In step S3, the owner group device registration processing unit 27 acquires the BD address of the mobile device 2 to be registered from the ID extraction unit 26, and supplies it to the recording control unit 29 to register it in the registration table recorded in the recording unit 30. The recording control unit 29 registers the acquired BD address in the registration table recorded in the recording unit 30 as the unique ID of the mobile device 2 of the owner group, and the process is completed.

By such processing, the BD address of the mobile device 2 of the owner group is registered in the vehicle anti-theft device 11. It has been assumed that the owner group device registration process is performed in parallel with other processes, and the process is looped until there is a command for starting the registration process. Alternatively, step S1 may be made as a higher-level process so as to start the processing shown in FIG. 3 from step S2 after receiving the command for the group device registration process.

Figure 4:
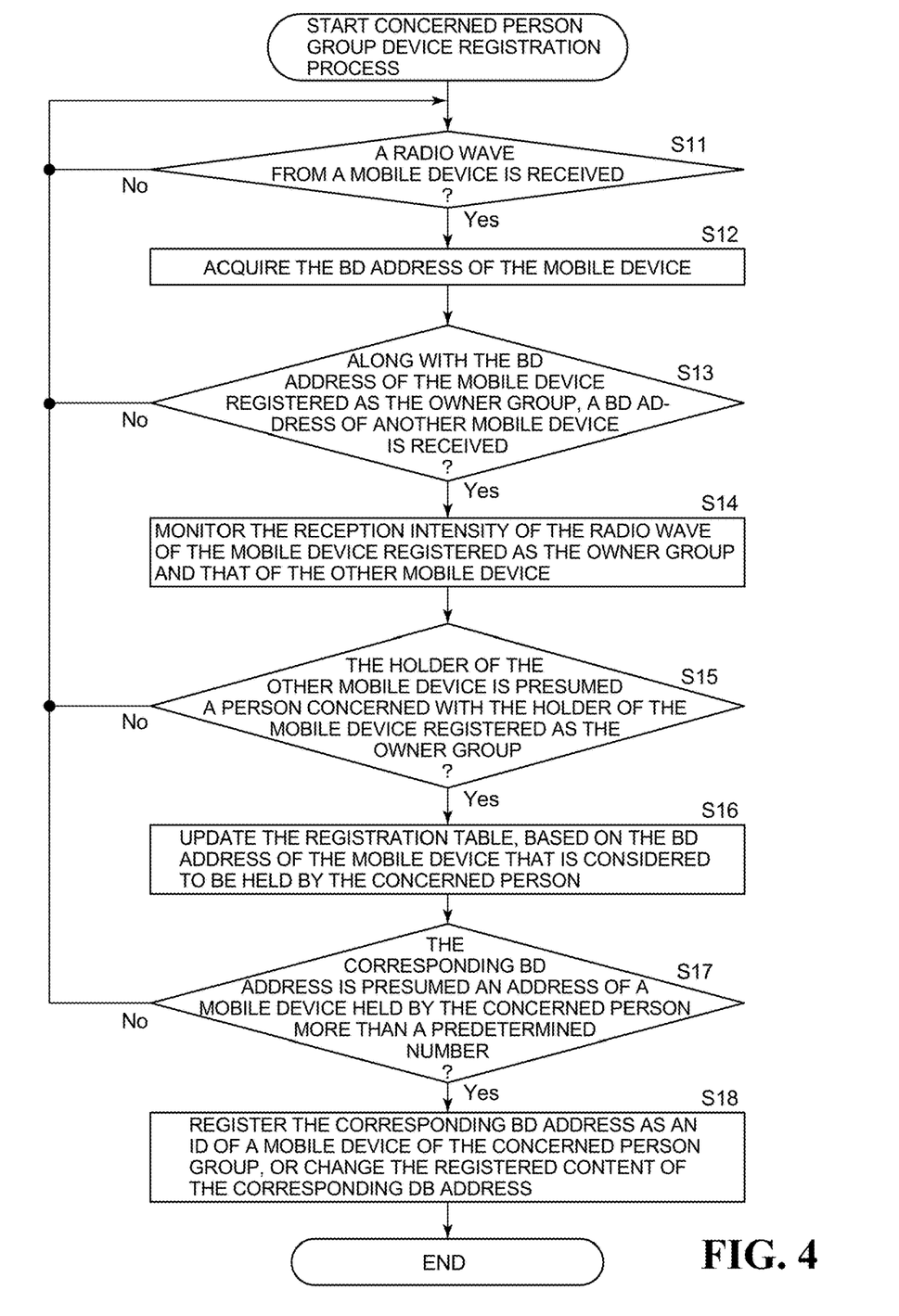
FIG. 4 is a flowchart for explaining a concerned person group device registration process.

A concerned person group device registration process executed by the vehicle anti-theft device 11 will be described with reference to the flowchart in FIG. 4.

In step S11, the communication control unit 24 determines whether the radio transmitter/receiver 23 has received a radio wave of any mobile device 2. When it is determined in step S11 that no radio wave of any mobile device 2 is received, the process of step S11 is repeated until it is determined that a radio wave of any mobile device 2 is received.

When it is determined in step S11 that radio waves of mobile devices 2 have been received, the ID extraction unit 26 is controlled by the communication control unit 24 in step S12 to extract BD addresses which are ID addresses of the mobile devices 2 received on communicating between the radio transmitter/receiver 23 and the mobile devices 2 and to supply these to the concerned person group device registration processing unit 28 and the group discrimination unit 31.

In step S13, the concerned person group device registration processing unit 28 determines whether the BD address of the mobile device 2 registered as the owner group with that of another mobile device 2 based on the BD address supplied from the ID extraction unit 26. When it is determined in step S13 that the BD address of the mobile device 2 registered as the owner group and an BD address of another mobile device 2 are not received, the process returns to step S11, and the subsequent processes are repeated.

If it is determined in step S13 that the BD address of the mobile device 2 registered as the owner group and that of the other mobile device 2 are received, the concerned person group device registration processing unit 28 monitors the reception intensity of the radio wave of the mobile device 2 registered as the owner group and that of the other mobile device 2 based on the radio field intensities of the mobile devices 2 in the wireless communication executed by the radio transmitter/receiver 23 with the mobile devices 2, which is supplied from the radio field intensity measuring unit 25.

In step S15, the concerned person group device registration processing unit 28 determines whether or not the holder of the other mobile device 2 can be presumed a person concerned with the holder of the mobile device 2 registered as the owner group, based on whether or not the changes in the reception intensity of the radio wave of the mobile device 2 registered as the owner group is substantially same with that of the other mobile device 2. When it is determined in step S15 that the holder of the other mobile device 2 cannot be presumed to be the person concerned with the holder of the mobile device 2 registered as the owner group, the process returns to step S11, and the subsequent processes are repeated.

In the above-mentioned process, the more the condition of the determination based on the radio field intensity is severe, the higher the security becomes. However, it becomes harder to register the BD address of the mobile device 2 actually held by the concerned person of the owner as a BD address of an mobile device 2 in the concerned person group. This is less practical. Therefore, the determination condition based on the radio field intensity may be set as appropriate depending on the balance between security required by the user and practicality.

If it is determined in step S15 that the holder of the other mobile device 2 can be presumed to be a concerned person of the holder of the mobile device 2 registered as the owner group, the concerned person group device registration processing unit 28 controls the recording control unit 29 to update the registration table recorded in the recording unit 30, based on the BD address of the mobile device 2 that is considered to be held by the concerned person in step S16.

In step S17, the concerned person group device registration processing unit 28 refers to the registration table recorded in the recording unit 30 via the recording control unit 29, and determines whether or not the corresponding BD address is presumed an address of a mobile device 2 held by the concerned person more than a predetermined number, more than one, of times for registering it as the concerned person group. When it is determined in step S17 that it is not regarded as the BD address of the mobile device 2 held by the concerned person more than the predetermined number of times, the process returns to step S11, and the subsequent processes are repeated.

In the above-mentioned process, the larger the predetermined number of times for determining that the relevant mobile device 2 is the mobile device 2 held by the person concerned with the owner of the vehicle 1 is, the higher the security becomes. However, it becomes harder to register the BD address of the mobile device 2 actually held by the concerned person of the owner as a BD address of an mobile device 2 in the concerned person group. This is less practical. Therefore, the number of times may be appropriately set depending on the balance between security required by the user and practicality.

When it is determined in step S17 that it is presumed as the BD address of the mobile device 2 held by the concerned person a predetermined number of times or more, the concerned person group device registration processing unit 28 newly registers the corresponding BD address as an ID of a mobile device 2 of the concerned person group, or change the registered content of the corresponding DB address, that is, the number of times that the mobile device 2 held by the concerned person has been presumed in step S18, and then the process ends.

According to the above-mentioned process, in the vehicle anti-theft device 11, the BD address of the mobile device 2 held by the person concerned with the owner of the vehicle 1 is automatically detected and recorded based on whether or not it is similar to the degree of change in strength in the radio field intensity of the radio wave received from the unregistered mobile device 2 is similar to that of the mobile device 2 registered in the owner group. Then, the BD address of the mobile device 2 of the person concerned with the owner of the vehicle 1 is automatically registered based on the number of times of detection. Further, at this time, the strictness of the determination condition based on the radio field intensity and the presumed number of times required for registration may be appropriately set depending on the balance between security required by the user and practicality. In addition, in this embodiment, it is assumed that the concerned person group device registration process is performed in parallel with other processes and the loop is performed until the radio wave of the mobile device is received. Alternatively, step S11 may be made as a higher-level process so as to start the processing shown in FIG. 4 from step S12 after receiving the radio wave.

Figure 5:
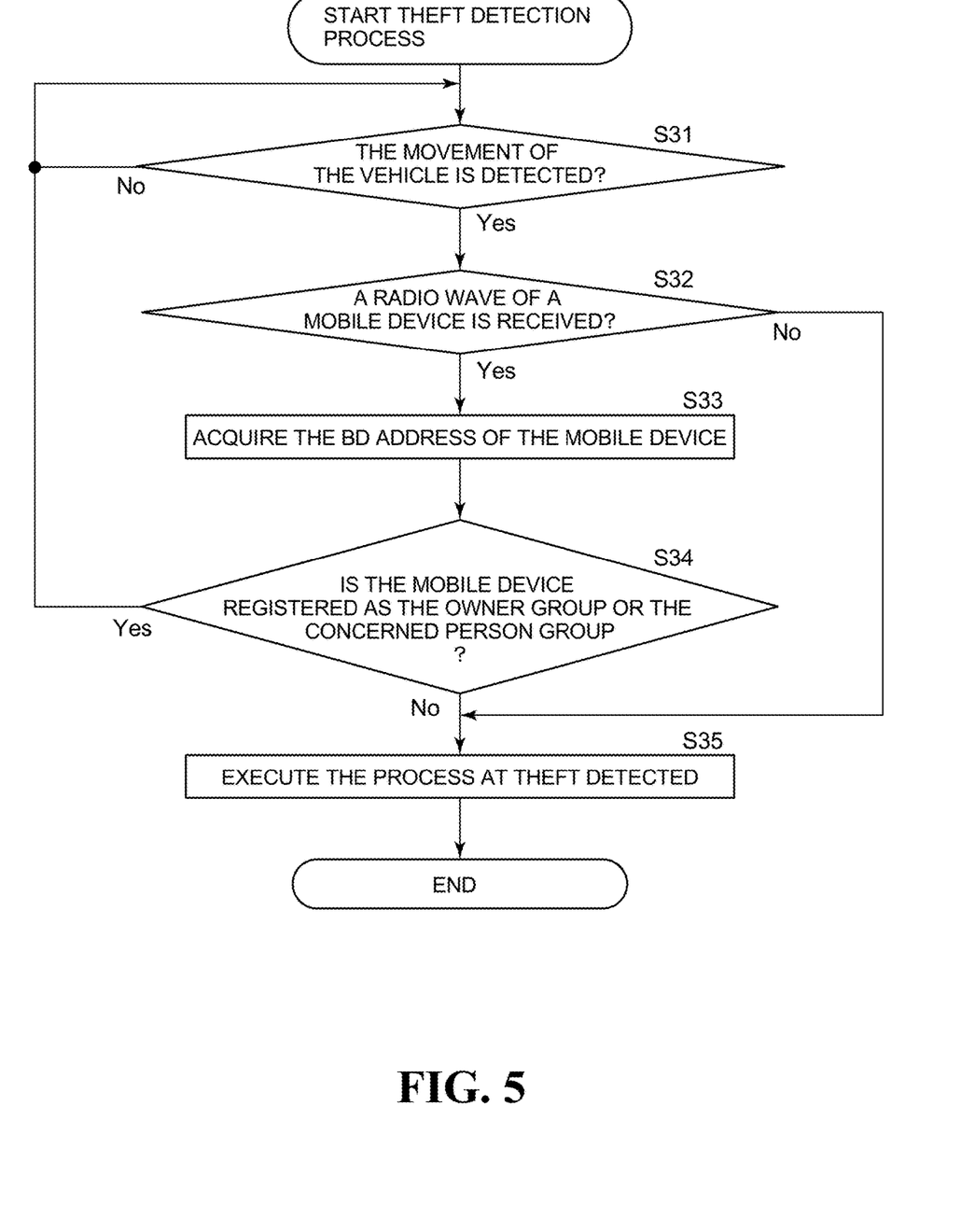
FIG. 5 is a flowchart for explaining a theft detection process.

A theft determination process will be described with reference to the flowchart in FIG. 5.

In step S31, the theft determination processing unit 32 determines whether or not the movement of the vehicle 1 is detected based on the information supplied from the various sensors 14 and the positioning system 15. When it is determined in step S31 that the movement of the vehicle 1 is not detected, the processing of step S31 is repeated until it is determined that the movement of the vehicle 1 is detected.

When it is determined in step S31 that the movement of the vehicle 1 is detected, in step S32, the communication control unit 24 determines whether the radio transmitter/receiver 23 has received a radio wave of a mobile device 2. When it is determined in step S32 that no radio wave of any mobile device 2 is received, the process proceeds to step S35 described below.

When it is determined in step S32 that a radio wave of a mobile device 2 is received, the ID extracting unit 26 controls the communication control unit 24 in step S33 to extract the BD address, which is the ID of the mobile device 2 received on communicating of the radio transmitter/receiver 23 and the mobile device 2, and to supply to the concerned person group device registration processing unit 28 and the group discrimination unit 31. Herein, the BD address extracted by the ID extraction unit 26 is not limited to one and may be plural.

In step S34, the group discrimination unit 31 refers to the registration table recorded in the recording unit 30 via the recording control unit 29, and determine whether the mobile device 2 having the BD address acquired in step S33 (if a plurality of BD addresses has been acquired, any one of these addresses) is the mobile device 2 registered as the owner group or the concerned person group. When it is determined in step S34 that the mobile device 2 is registered as the owner group or the concerned person group, the process returns to step S31, and the subsequent processes are repeated.

When it is determined in step S32 that no radio wave of a mobile device 2 is received, or when it is determined in step S34 that the mobile device 2 is not the mobile device 2 registered as the owner group or the concerned person group, the theft determination processing unit 32 determines in step S35 that the vehicle 1 is in the theft state, and notifies the vehicle cooperation unit 33 that the vehicle 1 is in the theft state. The vehicle cooperation unit 33 controls the alarm horn 12 to generate an alarm or controls the dashcam 13 to start recording, as a process when a theft is detected.

With the above processing, the vehicle anti-theft device 11 can executes the vehicle anti-theft process when the theft is detected. That is, the vehicle anti-theft device 11 determines whether or not the registered mobile device 2 exists inside the vehicle 1 or in the vicinity thereof, and determines that the vehicle 1 has been stollen if it is not exist. Therefore, even if there are a plurality of users who use the vehicle 1, the vehicle anti-theft device 11 can detect mobile devices 2 held by persons concerned with the owner of the vehicle 1 automatically detected, by registering the mobile device 2 held by the owner of the vehicle in advance, to prevent the vehicle 1 from being stolen without using another dedicated device. In this example, it is assumed that the theft determination process is performed in parallel with other processes, and the loop is executed until the movement of the vehicle is detected. Alternatively, step S31 may be made as a higher-level process so as to start the processing shown in FIG. 5 from step S32.

The present invention is not limited to the above-mentioned embodiment, and various modifications can be made within the scope of the present invention.

The invention claimed is:

1. A vehicle anti-theft device provided in a vehicle comprising:
    a radio receiver for receiving information including an ID of a mobile device wirelessly transmitted from the mobile device;
    a radio wave intensity measurement unit for measuring the intensity of the radio wave received from the mobile device;
    a first registration processing unit for registering a first ID received by the radio receiver in a predetermined procedure as an ID of a mobile device belonging to an owner group;
    a second registration processing unit for registering a second ID received by the radio receiver together with the ID registered in the first registration processing unit as an ID of a mobile device belonging to a concerned person group; and
    a theft determination processing unit for determining the vehicle being in a stolen state when the movement of the vehicle is detected while it is received no ID registered in the first registration processing unit or in the second registration processing unit at that time;
    wherein the second registration processing unit is configured to register the second ID as an ID of a mobile device belonging to the concerned person group when the degree of change in the reception radio wave intensity from the mobile device having the second ID is similar to that from a mobile device having an ID registered in the first registration processing unit.

2. The vehicle anti-theft device according to claim 1, wherein the second registration processing unit is configured to register the second ID as an ID of a mobile device belonging to the concerned person group when the number of times the degree of change in the reception radio wave intensity from the mobile device having the second ID being similar to that from a mobile device having an ID registered in the first registration processing unit exceeds a predetermined number of times.

3. The vehicle anti-theft device according to claim 1, wherein the second registration processing unit is configured to register the second ID as an ID of a mobile device belonging to the concerned person group when a movement of the vehicle is detected and both of the degree of change in the reception radio wave intensity from a mobile device having an ID registered in the first registration processing unit and that from the mobile device having the second ID are smaller than a predetermined value.

4. A vehicle anti-theft method including steps of:
    registering IDs each included in information transmitted from a predetermined mobile device having an ID and received by a radio receiver;
    measuring the intensity of the radio wave received from the mobile device; and
    determining a vehicle being in a stolen state when a movement of the vehicle is detected while no information including a registered ID is received at that time;

wherein:

the step of registering includes:

a first registration step for registering a first ID received by the radio receiver in a predetermined procedure as an ID of a mobile device belonging to an owner group; and a second registration step for registering a second ID received by the radio receiver together with the ID registered in the first registration step and the degree of change in the reception radio wave intensity from the mobile device having the second ID being similar to that from a mobile device having an ID registered in the first registration step as an ID of a mobile device belonging to a concerned person group; and the step of determining is executed in a state where it is received no ID registered in the first registration step or in the second registration step at that time.

5. A computer program executed by a processor of a vehicle anti-theft device provided in a vehicle when installed in the processor to perform steps of:

registering IDs each included in information transmitted from a predetermined mobile device having an ID and received by a radio receiver;

measuring the intensity of the radio wave received from the mobile device; and determining a vehicle being in a stolen state when a movement of the vehicle is detected while no information including a registered ID is received at that time;

wherein:

the step of registering includes:

a first registration step for registering a first ID received by the radio receiver in a predetermined procedure as an ID of a mobile device belonging to an owner group; and a second registration step for registering a second ID received by the radio receiver together with the ID registered in the first registration step as an ID of a mobile device belonging to a concerned person group and the degree of change in the reception radio wave intensity from the mobile device having the second ID being similar to that from a mobile device having an ID registered in the first registration step; and the step of determining is executed in a state where it is received no ID registered in the first registration step or in the second registration step at that time.

* * * * *